United States Patent [19]
Daniel et al.

[11] Patent Number: 5,802,177
[45] Date of Patent: Sep. 1, 1998

[54] APPARATUS FOR RADIO LOCAL LOOP SYSTEM

[75] Inventors: Elizabeth Mary Daniel, Chippenham; Malcolm Gordon, Bath; William Jones, Nr. Chippenham; Anthony Martin, Chippenham; Douglas Roger Pulley, Bath, all of England

[73] Assignee: Lucent Technologies, Inc., Murray Hill, N.J.

[21] Appl. No.: 722,690

[22] Filed: Sep. 30, 1996

[30] Foreign Application Priority Data

Oct. 20, 1995 [GB] United Kingdom ............... 9521564

[51] Int. Cl.⁶ .................................................. H04L 9/00
[52] U.S. Cl. ...................... 380/49; 455/403; 455/550; 455/560; 455/561
[58] Field of Search ............................ 455/403, 410, 455/411, 422, 462, 550, 560, 561; 380/49, 34

[56] References Cited

U.S. PATENT DOCUMENTS

| | | | |
|---|---|---|---|
| 4,890,315 | 12/1989 | Bendixen et al. | 455/554 |
| 5,555,258 | 9/1996 | Snelling et al. | 370/29 |
| 5,592,555 | 1/1997 | Stewart | 380/49 |
| 5,654,979 | 8/1997 | Levin et al. | 375/206 |
| 5,724,661 | 3/1998 | Nagashima | 455/561 X |

Primary Examiner—Thomas H. Tarcza
Assistant Examiner—Pinchus M. Laufer

[57] ABSTRACT

Apparatus for a radio local loop for a telecommunications system, such as a base station (1) or a subscriber station (2), comprises a first unit (4, 13), which includes call processing and speech transcoding/encryption apparatus (8, 17), and which can be housed in a friendly environment, such as within a telephone exchange or within a subscriber's premises, and a comparatively rugged second unit (3, 14) which includes a modem (11, 22) and radio transceiver (12, 23), and which can be housed, in the case of a base station, at a site remote from the exchange, but central for the subscribers which it is to serve, and in the case of a subscriber station on the outside of the subscriber's premises. The first and second units are linked by a base-band link (5, 15).

9 Claims, 1 Drawing Sheet

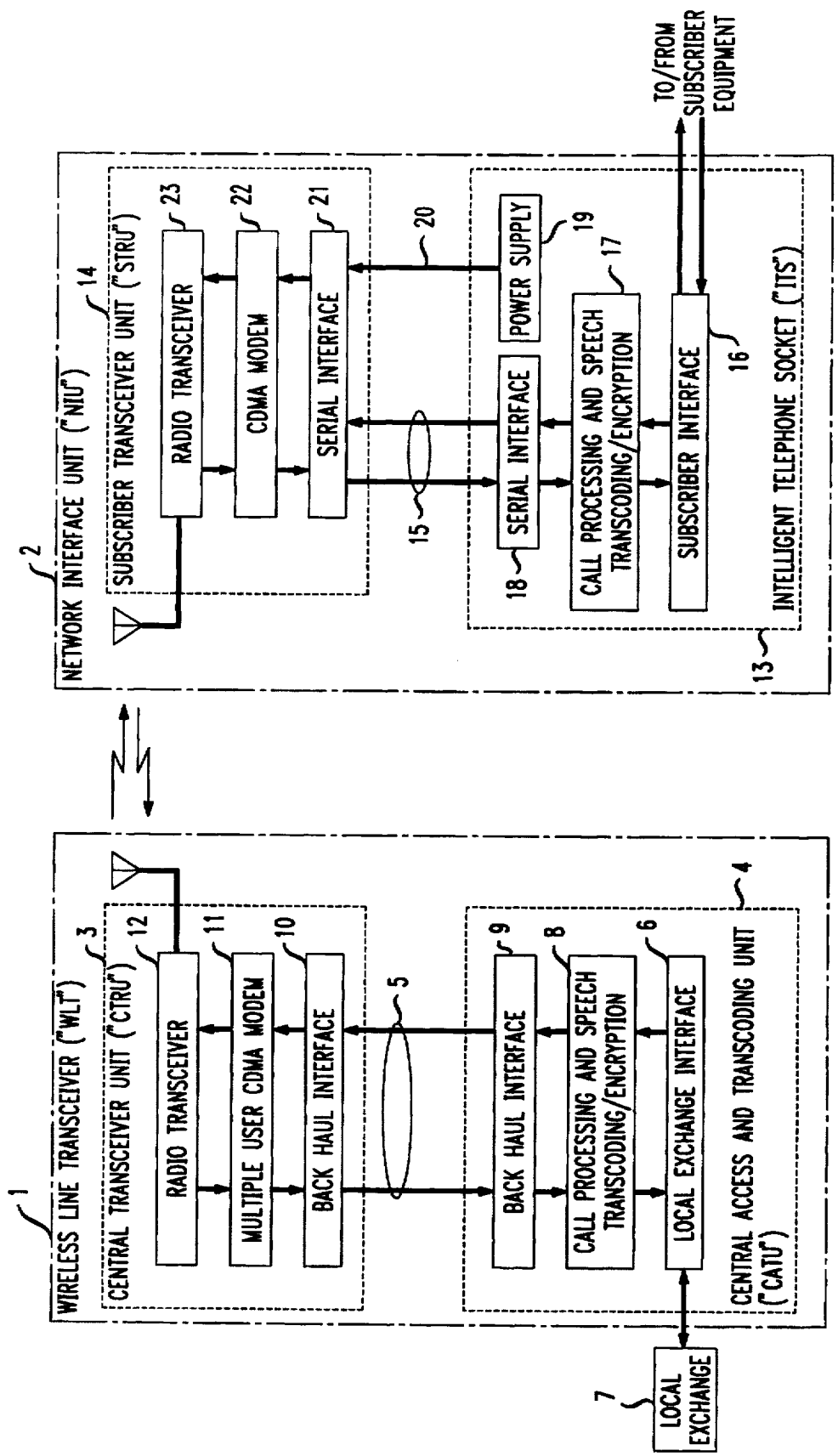

APPARATUS FOR RADIO LOCAL LOOP SYSTEM

BACKGROUND OF THE INVENTION

1. Field of the Invention

The present invention relates to telecommunications; more specifically, the local loop portion of a telecommunications system.

2. Description of the Prior Art

A local loop is the portion of a telecommunications system which connects a local exchange to the subscribers. Conventionally this is done by means of wires or optical fibers, but a radio link is another possibility. If subscriber stations are mobile, a radio link has to be used, but there are advantages even for static subscribers. For example, lines can be installed, changed and maintained without having to dig up pavements or erect and climb telegraph poles.

A radio local loop involves a base station, or wireless line transceiver (WLT), which transmits and receives radio signals at a location which is determined by signal strengths and reception conditions and is not necessarily near to the local telephone exchange, and network interface units (NIU) located at subscriber premises, each of which includes an antenna whose location is determined by considerations of signal reception and transmission, which is a connection to the subscriber's equipment (telephone, fax, computer etc.).

SUMMARY OF THE INVENTION

According to the invention, apparatus for use in a radio local loop system comprises a first unit, including call processing and speech transcoding/encryption apparatus, a second unit, including a modem and radio transmitting and receiving apparatus, and a base-band connection between the two units.

A wireless line transceiver according to the invention comprises:

a) a central access and transcoder unit (CATU), which includes call processing and speech transcoding/encryption apparatus and interface apparatus for connection to the local exchange, and which, when installed, is situated close to the local exchange, and preferably within the same building;

b) a central transceiver unit (CTRU), including a multiple user modem and radio frequency apparatus, which, when installed, is situated close to the antenna, at a location convenient for radio reception and transmission; and c) a base-band back haul link joining the CATU and the CTRU.

The back haul link may, for example, be a 2 Mbps link, supported by E1 interface units in the CATU and the CTRU. The E1 interface is a standard interface, defined in ETS 300 166 (1993) Transmission and Multiplexing (TM); 'Physical and electrical characteristics of hierarchical digital interfaces for equipment using the 2048 kbit/s-based plesiosynchronous digital hierarchies or synchronous digital hierarchies'.

A network interface unit according to the invention comprises:

a) an intelligent telephone socket (ITS) which includes call processing and speech transcoding/encryption apparatus and interface apparatus for connection to the subscriber's equipment, and which, when installed, is situated indoors within the subscriber's building at a convenient location for connection to the subscriber's equipment.

b) a subscriber transceiver unit (STRU), including a modem and radio frequency apparatus, and which, when installed, is situated close to the antenna, at a location convenient for radio reception and transmission; and c) a serial base-band link connecting the STRU and the ITS.

The STRU can be installed outside of the subscriber's building. Preferably the ITS also includes a power supply unit which supplies the STRU via a low-voltage connection, so there is no high-voltage line outdoors.

The wireless line transceiver unit requires connection via multiple 2 Mbps E1 interfaces to the local exchange to convey subscriber traffic to the rest of the operator's network. However, the radio reception and transmission portion of this apparatus must be located at a place convenient for radio reception and transmission which, in many cases, will be remote from the local exchange. This will require the use of digital transmission facilities between the remote site and the local exchange with associated operating cost proportional to the number of 2 Mbps E1 transmissions required. Since the WLT contains speech transcoding units for efficient use of radio bandwidth between it and the NIUs, by locating the speech transcoding functions of the WLT at the local exchange, the number of E1 links needed for back haul from the remote site is reduced with consequent reduction in network deployment cost.

The network interface units comprise two categories of apparatus: those that must be located as near as possible to the antenna because of the expense of carrying radio frequency signals between the apparatus and the antenna and those that require more convenient access by the subscriber for user configuration and/or network operator personnel for upgrade and maintenance. The first category includes radio frequency apparatus and modem apparatus whereas the second may include call processing and speed transcoding/encryption units and smartcard facilities. One problem for both wireless line transceiver unit and network interface unit is the expense of providing apparatus that can operate in a hostile environment if the apparatus is to be kept at a location convenient for radio reception and transmission. Partitioning as described reduces to a minimum the amount of units required in the outdoor version of both.

Thus, the CATU and the ITS, which contain the more delicate call processing and speech transcoding/encryption apparatus, can be installed indoors in the comparatively friendly environment of a telephone exchange building or a subscriber's office, respectively, while the links to the transceiver units are comparatively inexpensive base-band links.

BRIEF DESCRIPTION OF THE FIGURE

An embodiment of the invention will now be described by way of example with reference to the accompanying drawings in which:

The FIGURE is a schematic diagram showing a wireless line transceiver and one of the network interface units with which it is in communication.

DETAILED DESCRIPTION

The FIGURE shows a wireless line transceiver (WLT) 1 and a network interface unit (NIU) 2. In fact the WLT 1 will be in communication with many NIUs, but for the purpose of explanation only one is shown. The WLT 1 consists of a central transceiver unit (CTRU) 3, which includes the radio part of the WLT and is situated at a location which is central to the NIUs with which it is in communication, and a central access and transcoder unit (CATU) 4, which is located within the building of the local telephone exchange. The CATU is connected to the CTRU 3 by a base-band link 5.

The CATU 4 includes local exchange interface 6 to the local exchange 7, which local exchange interface 6 is also connected to call processing and speech transcoding/encryption apparatus 8.

The interface 6 provides an interface into the integrated services digital network (ISDN) and/or public switched telephone network (PSTN) by either using multiple (up to sixteen) instances of the V5.1 protocol or a single instance of the V5.2 protocol. The V5.1 protocol is defined in ETS 300 324-1 (1993) 'Signalling Protocols and Switching; V interfaces at the digital Local Exchange (LE) V5.1 interface for the support of Access Network (AN), part 1: V5.1 interface specification'. The V5.2 protocol is defined in ETS 300 347-1 V5.2 'Interface for the support of an access network'.

The call processing and speech transcoding/encryption apparatus 8 authenticates access to the network, provides encryption keys to the NIUs and provides encryption/decryption between the NIUs and CATU. It also provides transcoding between 64 kbit/s 'A' law pulse code modulation as used by the local exchange and 16 kbit/s low delay code excited linear prediction coding or 32 kbit/s adaptive differential pulse code modulation whichever grade of speech quality is required over the radio link.

An interface unit 9 in the CATU 4 connects the CATU via the link 5 to an interface unit 10 in the CTRU 3. The interfaces 9 and 10 and the link 5 support multiple 16 kbit/s channels over one or two E1 links. Each E1 link transfers data in 256 bit frames at the rate of 8 k frames per second. Bits 0 to 7 inclusive are used for link mangement. Bits 128 to 135 provide a 64 kbit signalling channel between the CATU 4 and the CTRU 3. The remaining bits are arranged into 2 bit time slots, each providing a 16 kbit/s logical channel. Each E1 line can support up to 120 such channels. 64 and 32 kbit/s channels can be constructed by multiple 16 kbit/s channel assignment.

The interface unit 10 in the CTRU 3 is connected to a multiple user code division multiple access (CDMA) modem 11 which is connected to a radio transceiver 12. The modem 11 maps each of the timeslots of the E1 link 5 into a particular multiple access code. The mapping between E1 timeslots and CDMA codes is fixed. Thus each of the 16 kbit/s logical channels on the E1 link 5 corresponds to a fixed CDMA channel on the radio link. Both forward (WLT to NIU) channels and reverse (NIU to WLT) channels use direct sequence spread spectrum with a chipping rate of 8.192 Mchip/s. Forward channels are CDMA multiplexed onto one frequency and reverse links onto another.

The NIU 2 consists of an intelligent telephone socket (ITS) 13 and a subscriber transceiver unit (STRU) 14 connected by a serial link 15. The ITS is an indoor unit providing the telephone socket within the customer premises and the STRU is an outdoor unit.

The ITS 13 includes an interface 16 to the subscriber's equipment. The subscriber interface 16 includes physical interfaces for both telephone service (POTS) and ISDN service, while the actual subscriber line function is configurable in software. Hence the unit can support at one time either two autonomous POTS lines (two separate telephone numbers) or one ISDN BRA line. It would be possible to provide more lines by providing more hardware. For example it may be desired to provide three ISDN BRA lines or six POTS lines. The subscriber interface 16 may also include a smart card reader.

The subscriber interface 16 is connected to call processing and speech transcoding/encryption apparatus 17 which provides speech encoding to match that supported by the call processing and speech transcoding/encryption apparatus 8 in the CATU 4.

The call processing and speech transcoding/encryption apparatus 17 is connected to the serial link 15 via a serial interface 18.

The ITS also includes a power supply unit 19 which provides a power supply for the ITS and also, via a low voltage power supply line 20, to the STRU 14, which therefore needs no power supply unit of its own and has no mains voltage power connection.

The STRU 14 is connected to the serial line via a serial interface 21 and includes a CDMA modem 22 connected to a radio transceiver 23. The modem 22 maps between 16 kbit/s logical channels and CDMA codes in a fixed relationship, as does the modem 11 in the CTRU 3, but only for the channels belonging to the particular NIU 2. The radio transceiver 23 communicates with the transceiver 12 of the CTRU 3.

The invention claimed is:

1. A wireless line transceiver comprising:
   a central access and transcoding unit comprising:
      a call processing and speech transcoding/encryption apparatus, and
      a first back haul interface connected to said call processing and speech transcoding/encryption apparatus; and
   a central transceiver unit comprising:
      a multiuser modem, and
      a radio transceiver connected to said multiuser modem,
      a second back haul interface connected to said multiuser modem; and
   a base-band connection between said first back haul interface and said second back haul interface.

2. The apparatus of claim 1 wherein said central transceiver unit comprises a local exchange interface for connection to a local exchange.

3. The apparatus of claim 1 wherein said base-band connection comprises a plurality of timeslots and said multiuser modem maps each of said timeslots into a particular multiple access code.

4. A network interface unit comprising:
   an intelligent telephone socket comprising:
      a call processing and speech transcoding/encryption apparatus, and
      a subscriber interface connected to said call processing and speech transcoding/encryption apparatus, and
      a first serial interface connected to call processing and speech transcoding/encryption apparatus;
   a subscriber transceiver unit comprising:
      a modem,
      a radio transceiver connected to said modem, and
      a second serial interface connected to said modem; and
   a base-band connection between said first serial interface and said second serial interface.

5. The apparatus of claim 4 wherein said subscriber interface provides an ISDN line to a subscriber apparatus.

6. The apparatus of claim 4 wherein said subscriber interface for connection to a subscriber apparatus provides two autonomous telephone lines.

7. The apparatus of claim 4 wherein said intelligent telephone socket comprises a power supply unit arranged to supply power to said subscriber transceiver unit via a low voltage connection.

8. The apparatus of claim 4 wherein said subscriber transceiver unit is adapted to be mounted outdoors.

9. The apparatus of claim 4 wherein said modem is a code division multiple access modem.

* * * * *